March 26, 1963    J. P. McCLUNG    3,082,536
TELESCOPING INSIDE GAGE INSTRUMENT
Filed Nov. 12, 1957
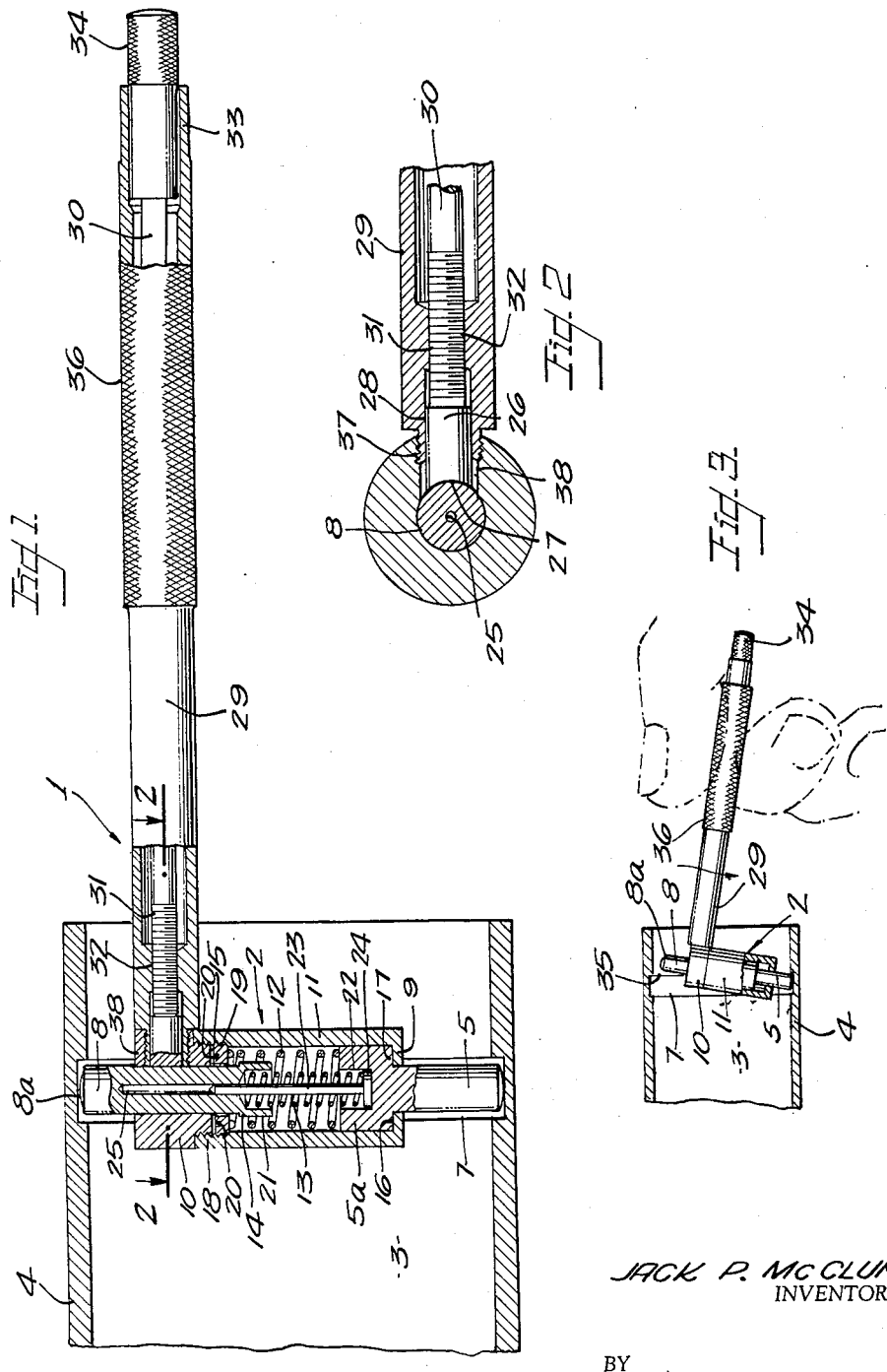
JACK P. McCLUNG
INVENTOR.
BY
*Francis D. Ummun*
ATTORNEY United States Patent Office 3,082,536
Patented Mar. 26, 1963

3,082,536
TELESCOPING INSIDE GAGE INSTRUMENT
Jack P. McClung, 11417 Excelsior Drive, Norwalk, Calif.
Filed Nov. 12, 1957, Ser. No. 695,778
7 Claims. (Cl. 33—143)

This invention relates to a telescoping gage, an instrument that is capable of being employed to measure the diameter of a groove that has been cut into the face of a bore.

The invention is a solution for a problem that presents itself due to the fact that the use of ordinary inside calipers to measure the diameter of such a groove, is impossible because the withdrawal of the caliper tips from the groove necessitates reducing the angle between the legs of the caliper.

If, and when that angle is changed a micrometer can merely measure the distance between the tips that were required to withdraw the caliper from the groove.

An object of this invention is to produce a caliper having special features of construction that will enable the caliper to be freed from a groove such as referred to, and which after its removal will assume the same distance between the tips of its legs that it had when it was set in the groove to take the measure of its diameter.

The principle on which the caliper operates, depends upon the use of two projecting contact pins that are in axial alignment with each other and which project outwardly from the body of the instrument.

In using the instrument it is introduced into the bore and the pins lodged in the groove, being biased toward their extended positions by their springs. Then the instrument is manipulated to hold one of the pins in a fixed position, after which the gager exerts pressure on the handle of the gage to force the other pin that is still free, against the face of the groove. This compresses the spring of the free pin and reduces the distance between the tips of the pins sufficiently to enable the gage to be withdrawn from the groove, whereupon the spring-back of the pin that was pressed against the face of the groove resumes its extended position. The tips of the pins are then in the relation they had when one of the pins became fixed. So it is merely necessary to use a micrometer to gage the distance between the tips of the pins.

The body of the gage preferably includes a cylinder with a removable head at one end which receives the thrust of the spring which biases the pin outwardly that lies at the other end of the cylinder.

One of the objects of the invention is to provide the end of the cylinder with means for retaining this spring when the head at this end of the cylinder is removed for any reason; also to provide special means for guiding and centering the relatively weaker of the two springs. Another object of the invention is to provide for the easy placement of different length of contact pins in the instrument without removing a washer that retains the spring for the lightly biased contact pin.

Further objects of the invention will be evident from a careful reading of this specification and study of the accompanying drawing.

The invention consists in the novel parts and combination of parts to be described hereinafter, all of which contribute to produce an efficient telescoping inside gage instrument.

A preferred embodiment of the invention is described in the following specification, while the broad scope of the invention is pointed out in the appended claims.

In the drawing:

FIGURE 1 is a side elevation and partial section through a gage instrument embodying this invention, and showing a portion of a member having a bore with a groove cut in its face, the instrument being shown applied in the groove as it would be in practice when measuring the diameter of the groove.

FIGURE 2 is a horizontal detail section taken in the line 2—2 of FIGURE 1 and further illustrating the means for holding the pin that has the relatively weak spring, in a fixed position after the contact pins have been lodged in the groove, the diameter of which is to be measured.

FIGURE 3 is a view showing a bore and cut in its face section, with the instrument shown as being removed from the bore by the gager whose hand is developing pressure against the pin that has the relatively strong spring.

In FIGURE 1 this instrument 1 is represented with its casing 2 placed within the bore 3 of a tubular part 4, and the view shows a contact main releasing pin 5 which may be called the main pin of the device, engaging the face of an undercut groove 7 formed in the bore.

In axial alignment with this pin 5 and at the other end of the casing 2 a contact pin 8 is shown. These pins 5 and 8 are respectively mounted to slide in and out in the integral head 9 and the head 10 which is removably threaded into the other end of cylinder 11 to function as a cap substantially closing the end of the cylinder, which with the heads constitute the casing 2 already mentioned.

These contact main pins 5 and measuring pin 8 are biased, preferably by springs 12 and 13, to maintain normally their extreme extended position. The spring 12 is relatively stronger as compared with the spring 13 which is a much smaller and weaker coil spring, which is coaxial within the larger spring 12. The main pin 5 has a head 16 of larger diameter than its body and this head fits neatly into the inner diameter of the tubular casing 2.

These springs and their corresponding pins have slightly different functions with respect to the operation of the instrument in introducing it into the groove 7 to take the measure of the groove's diameter. In other words, when the measurement is being taken, the pin 8 that is biased by the lighter spring is held in contact with the face of the groove, in a partially retracted position, that is to say, an annular shoulder 14 on the pin 8 that normally seats on the inner face 15 of the head 10 is considerably displaced from this face 15 when taking a measurement; and the other pin 5 is completely extended as usual with its shoulder 16 seated against the inner face 17 of the transverse head 9 at the lower end of the casing, as illustrated in FIGURE 1.

The inner end of the head 10 is connected into the upper end of the cylinder 11 by a threaded connection 18, but in assembling the parts I first insert a washer 19 that has its outer edge threaded to mesh with the threads of the thread connection 18.

The upper face of this washer has two sockets 20 for the application of a special spanner wrench having elongated steel pins to reach into the point where the washer seats.

The relatively large and stronger spring 12 seats directly upon the under face of this washer. The presence of this washer is desirable because it retains the spring 12 whenever it may be necessary to remove the head or cap 10 for this end of the cylinder 11.

The inner, lighter, spring has its ends received in two sockets, one of which is the socket 21 that is shown at the inner end of the pin 8; and the other socket 22 is formed on the axis of the main pin 5 and is of a diameter to fit neatly to the periphery of the small spring.

In order to facilitate the assembling of the spring 13 and the pin 8, and also to operate as a guide on the axis of the pin 8, I prefer to employ a central guide pin 23 the lower end of which, as shown in FIGURE 1, is formed with an integral head 24. The upper end of this pin fits neatly into a drilled hole 25 that extends up a considerable distance along the length of the pin 8.

In order to fix or clamp the pin 8 in the position it has when the measurement of the diameter of the groove 6 is taking place, I provide a brake block 26 (see FIGURE 2) the inner face 27 of which is an arc on the same radius as the surface of the pin 8. However, the vertical cross-section of this block is circular so that it can fit into, and be guided by a bore 28 in the forward end of the handle member 29.

This block at its outer end is abutted by a stem 30 the inner portion of which carries threads 31 that mesh with the threads 32 of the handle member 29 that are located near the block.

The unthreaded body of this stem extends back to the rear end 33 of the handle and has a knurled tip 34 that projects out sufficiently to enable it to be used to rotate the stem; which of course, by reason of the thread 31, advances block 26 toward the pin 8 so that it can be tightened against it.

When this is accomplished, pin 8 will be held fixed in position, after which the gager will exert a lateral force against the handle member 29 acting in the direction of the arrow as shown in FIGURE 3. This will cause compression of the spring 12 by the reaction of the wall of the tubular extension 4. This will enable the overall dimension between the extreme ends of the pins to be reduced sufficiently to enable the tip of the pin 8 to clear the shoulder 35 at the side of the groove 7, thereby enabling the instrument to be withdrawn from the bore.

If desired, the middle portion 36 of the handle member may be also knurled to enable the gager to have a good grip on the instrument when manipulating it.

The introducing of the casing of the instrument into the bore can be accomplished readily by pressing against the end of the pin 8, and forcing it in far enough to enable it and the other pin and the casing 2 of the instrument to be swung into the bore; in other words, using a series of movements which would be in reverse order to the movements employed in disengaging the pins from their set position in the groove after gaging its diameter.

The end faces of the contact pins 5 and 8 should have filisters 8a on a small radius enabling them to conform desirably to the arc on the groove to which the tips of the pins are applied.

In taking a measurement with this instrument if the groove has sufficient depth and the filister is of sufficiently small radius the gager can shove the instrument in far enough to seat the sides of the pins against the side face of the groove, when he is about to clamp the pin 8 in its place.

The forward end of the handle member 29 has a tip 37 of reduced diameter that is threaded into a threaded socket 38 in the side of the cap 10.

The arc 27 at the forward face of the block 26 keeps the block from rotating even when the stem 30 is backed off slightly to face the pin 8 when taking a measurement.

The diameter of the shoulder 14 is less than the diameter of the opening in the washer 19 so the pin 8 can be removed through the washer without removing the washer or the spring 12 when changing pins.

Many other embodiments of this invention may be resorted to without departing from the spirit of the invention.

I claim as my invention and desire to secure by Letters Patent:

1. In a telescoping inside gage instrument to be introduced into a bore, and thence into an undercut groove on the face of the bore to measure the diameter of the groove, the combination of a tubular casing, two gage pins distinct from said casing projecting beyond the ends of said casing and guided by the casing to slide to and fro, one of said pins being a main pin, a relatively strong coil spring concentric with the main pin and exerting its force to hold the main pin in its extreme outward position within the casing, when the measurement is being taken, a relatively weak spring concentric with the other pin and exerting its force in a direction to move it outwardly from the casing, means mounted in the casing for breaking the last named pin in its extended position when the two pins are resting with their ends in the groove, and fixing means including a screw-actuated part for pressing the breaking means against the side of the pin that is associated with the relatively weak spring.

2. A telescoping inside gage instrument to be introduced into a bore and then into an undercut groove on the face of the bore, according to claim 1, in which the adjacent ends of the two pins have relatively small axial bores therein, and a guidepin with its ends received in the small axial bores for receiving and centering the weaker spring, said weaker spring being of smaller diameter than the stronger spring.

3. In a telescoping inside gage instrument to be introduced into a bore and thence into an inside groove on the face of the bore, for measuring the diameter of the groove, the combination of a tubular casing, said casing having an integral head at one end with an opening through the same, a main gage pin having a body fitting through said opening and projecting outwardly beyond the adjacent end of the casing, said main gage pin having an enlarged head within the casing fitting to and guided by the bore of the casing, a removable cap mounted on the end of the casing remote from the main gage pin, said cap having a central guide opening therethrough; a contact pin guided in the said opening in said cap, a coil spring of relatively large diameter and strength located within the bore of the casing and thrusting at one end through the washer, to and against the inner face of the head of the main pin to maintain that pin normally in its position extending beyond the adjacent end of the casing, and a head at the other end of the casing receiving the thrust at the other end of the coil spring of relatively large diameter; and a second, relatively weak and small coil spring coaxial with the first named spring, seated on the inner end portion of the head of the main pin and thrusting at its other end against the inner end portion of the contact pin, a laterally extending handle secured to the side of said cap, a clamping block resting against the side of said contact pin, and means carried by said handle for pressing the block forcibly against the side of said contact pin to hold the same in a fixed position when both pins of the gage have been introduced into the groove to be gaged, thereby enabling lateral pressure to be exerted thereafter by the handle to press the tip of the main pin with sufficient force against the face of the groove to compress the relatively strong coil spring sufficiently to permit the tip of the contact pin to be swung outwardly from the groove and past the outer shoulder of the groove in the bore, thereby enabling the distance between pin tips to be measured thereafter with a micrometer.

4. In a telescoping inside gage instrument to be introduced into a bore and thence into an undercut groove on the face of the bore to measure the diameter of the groove, the combination of a tubular casing with a handle extending laterally therefrom, two gage pins projecting beyond the ends of said casing, said casing having guide means to enable the pins to slide to and fro, springs corresponding respectively to the pins for yieldingly biasing said pins toward their extreme outwardly extended positions, one of said springs being relatively weaker than the other; and fixing means including a screw-actuated part for engaging the side of the pin having the weaker spring, said springs being coil-type springs, and the pin having the relatively stronger spring also having a socket in its inner end receiving the end of the weaker spring for centering the same.

5. In a telescoping inside gage instrument to be introduced into a bore and thence into an undercut groove on the face of the bore to measure the diameter of the groove, the combination of a tubular casing with a head at each end, two gage pins projecting beyond the ends of said casing, and guided through said heads to slide to and fro, springs for yieldingly biasing said pins toward their extreme outwardly extended positions, one of said springs being relatively weaker than the other, and fixing means including a screw-actuated part for engaging the side of the pin having the weaker spring, said springs being of coil-type, and the pin having the relatively stronger spring having a socket in its inner end receiving the end of the weaker spring for centering the same, and including a relatively small guide pin coaxial with said first named pins, said guide pin having a head received in, and centered by said socket, said pin that has the weaker spring having a guide bore receiving and guiding the other end of the guide pin.

6. A telescoping inside gage instrument according to claim 3, in which the said cap has a thread connection to the end of said casing adjacent the contact pin corresponding to the weaker spring, and said head at the other end of the casing having a thread connection into the casing adjacent the inner end of the stronger spring and against which the stronger spring thrusts and is retained thereby when the cap is removed.

7. A gage instrument according to claim 6, in which the pin that is biased by the relatively weaker spring, has a shoulder the diameter of which is smaller than the opening in the washer thereby permitting the shoulder to pass through the opening in the washer to seat normally upon the inner face of the cap.

References Cited in the file of this patent

UNITED STATES PATENTS

| 905,110 | Starrett et al. | Nov. 24, 1908 |
| 1,583,585 | Emery | May 4, 1926 |
| 1,860,640 | Witchger | May 31, 1932 |
| 2,352,313 | Gernald | June 27, 1944 |
| 2,877,558 | Gaxiola | Mar. 17, 1959 |

FOREIGN PATENTS

| 463,361 | Great Britain | Mar. 30, 1937 |
| 534,464 | Canada | Dec. 18, 1956 |

OTHER REFERENCES

Article in American Machinist, p. 112, June 26, 1950. (Copy in Scientific Library, U.S. Patent Office.)

Publication in American Machinist, pages 181–182, February 13, 1935. (Copy in Scientific Library, U.S. Patent Office.)